Sept. 27, 1955

J. H. GAUTIER 2,718,796

HYDRO-MECHANICAL POWER DRIVE TRANSMISSIONS

Filed Sept. 8, 1951

Inventor
Jacques Henri Gautier
By Robert E Burns
Attorney

Sept. 27, 1955 J. H. GAUTIER 2,718,796
HYDRO-MECHANICAL POWER DRIVE TRANSMISSIONS
Filed Sept. 8, 1951 6 Sheets-Sheet 3

Inventor
Jacques Henri Gautier
By Robert E Burns
Attorney

Sept. 27, 1955 J. H. GAUTIER 2,718,796
HYDRO-MECHANICAL POWER DRIVE TRANSMISSIONS
Filed Sept. 8, 1951 6 Sheets-Sheet 4

Inventor
Jacques Henri Gautier
By Robert E. Burns
Attorney

Sept. 27, 1955    J. H. GAUTIER    2,718,796
HYDRO-MECHANICAL POWER DRIVE TRANSMISSIONS
Filed Sept. 8, 1951    6 Sheets-Sheet 5

Inventor
Jacques Henri Goutier
By Robert E Burns
Attorney

Fig. 15

United States Patent Office 2,718,796
Patented Sept. 27, 1955

2,718,796

HYDRO-MECHANICAL POWER DRIVE TRANSMISSIONS

Jacques Henri Gautier, Paris, France, assignor to Société Anonyme Francaise du Ferodo, Paris, France, a corporation of the French Republic Application September 8, 1951, Serial No. 245,709

Claims priority, application France September 22, 1950

10 Claims. (Cl. 74—677)

This invention relates to hydro-mechanical transmission apparatus of the type having a continuous variation of both torque and speed ratios between a drive shaft and a driven shaft, and comprising impeller vanes connected to said drive shaft and impelling through a fluid successive sets of turbine vanes and sets of reactor vanes, said sets of turbine vanes being secured to pinions engaging with gears of a mechanical device controlling said driven shaft.

It is an object of the present invention to provide a hydro-mechanical transmission apparatus of this type, wherein the speed ratio between the drive shaft and the driven shaft is continuously varying and automatically adapted to the opposing torque and to provide such an improved apparatus wherein the efficiency rises from the very outset of the starting period to a high value approximating the final value attached by it in steady operation.

According to the invention, a hydro-mechanical transmission apparatus of above mentioned type is characterized in that the mechanical device is so arranged as to utilize the velocity difference between the consecutive sets of turbine vanes for continuously and as widely as desired varying the torque and speed ratios between the drive shaft and the driven shaft, as functions of said velocity difference.

According to the invention, a hydro-mechanical transmission apparatus comprises two differentials in cascade, of which the input differential pinion carrier is connected to a first sun gear of output differential, while the output differential pinion carrier is connected to driven shaft, the set of turbine vanes adjacent to the impeller fluid output being connected to a first sun gear of input differential, while the next set of turbine vanes is connected to the second sun gear of input differential.

According to the invention, two one-way drive devices are inserted between an element secured to a set of reactor vanes and an element secured to the second set of turbine vanes, one of said one-way drive devices interconnecting said elements for forward rotations, while the other one-way drive device is associated with a reverser and multiplier device and interconnects said elements for opposite rotations, so that the rearward rotation of the second turbine is prevented and, for a forward rotation of the second turbine, the algebraic ratio of said elements rotation speeds is between two fixed numbers having contrary signs and different absolute values.

The above and further features and objects of the invention will appear from the ensuing description, made with reference to the accompanying drawings which illustrate merely by way of indication and not of limitation, a few exemplary embodiments of the invention. In said drawings.

Referring to Figs. 1 to 7, a drive transmission according to the invention is diagrammatically illustrated as interposed between a drive shaft 1 connected to the engine of a vehicle, and the driven shaft 2 connected to the wheels of the vehicle. According to the invention, there is provided within a casing 3 a torical hydraulic section which comprises, arranged in succession, a pump or impeller 4, a first turbine 5, a second turbine 6 and a reactor or balancer unit 7.

The drive shaft 1 is secured at 8 to a disc 9 rigid with an annulus 10. The annulus is secured as at 11 to the pump 4. Turbine 5 is connected by a disc 12 to a shaft 13 having secured to it a pair of gears 14 and 15 each of which constitutes a sun gear for an input differential and an output differential respectively, said differentials being epicyclic in character and mounted in cascade relation. Shaft 13 is supported in ball bearings 16 and 17 respectively fitted in the ends of shafts 1 and 2. A one-way drive device 18 is interposed between shaft 13 and disc 9 (Figs. 2 and 6), in such a way as to prevent shaft 13 from revolving at a faster rate than drive shaft 1.

Figure 2:
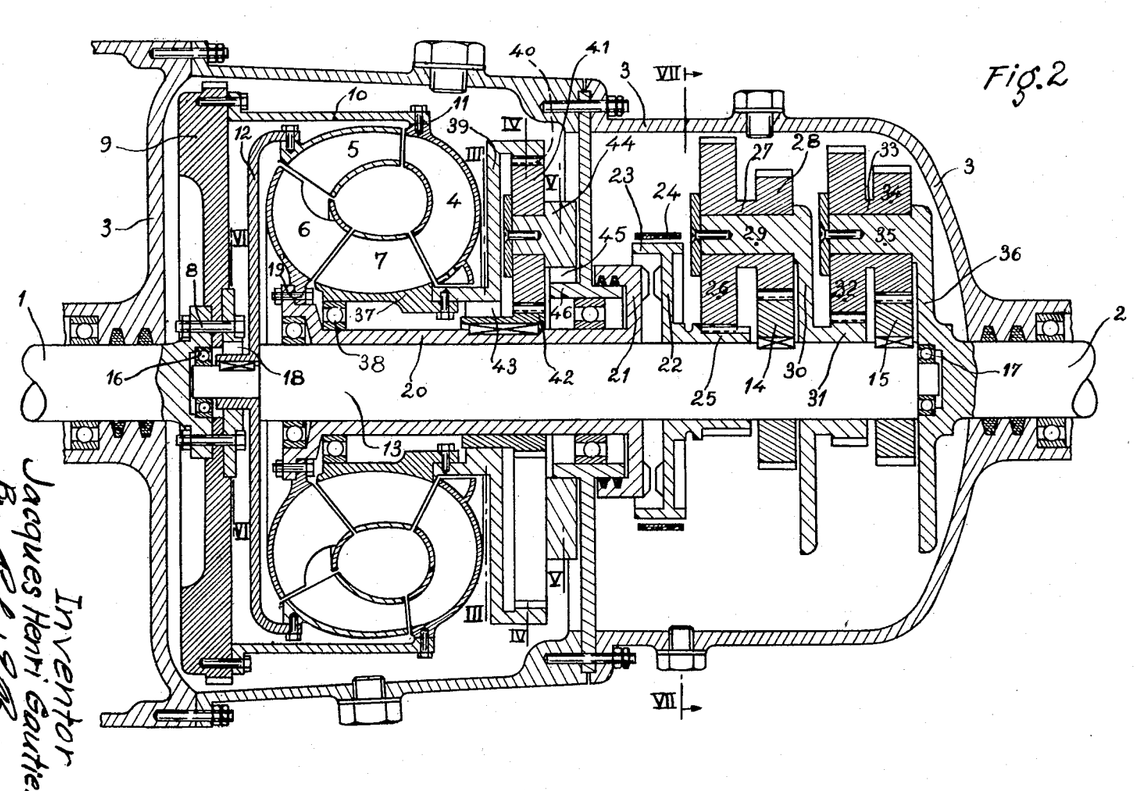
Fig. 2 is a detailed longitudinal sectional view of the apparatus shown in Fig. 1.

Turbine 6 is rigidly connected at 19 with a bushing 20 freely mounted on shaft 13 and formed at its end as a clutch face 21, which may be of the claw-clutch type or any other suitable kind, and may be displaced with a clutch fork not shown, into and out of engagement with a cooperating clutch face 22. Clutch face 22 is formed with a cylindrical peripheral flange 23 cooperating with a brake lining 24.

The disc 22 is freely rotatable on shaft 13 and is rigidly connected with a gear 25 providing the other sun gear on the input differential. Gear 25 meshes with a gear 26 rigidly connected by a bushing 27 with a gear 28, meshing with gear 14. Bushing 27 is mounted for free rotation on a spindle 29 of a planetary carrier 30. The latter is freely rotatable on shaft 13 and is integral with a gear 31 providing the other sungear of the output differential. Gear 31 meshes with a gear 32 rigidly connected through a bushing 33 with a gear 34 in mesh with gear 15. Bushing 33 is mounted for free rotation on a spindle 35 of a planetary-carrier 36 rigid with the drive shaft 2.

The amount of driven shaft speed reduction can be adjusted by a suitable selection of the respective drive ratios between the meshing gears 25—26, 14—28, 31—32, 15—34.

The balancer unit 7 is unitary with a bushing 37 mounted on bushing 20 through interposed ball bearings 38. Bushing 37 is unitary with a disc 39 formed with an inwardly directed set of teeth. The teeth mesh with toothed gears such as 41 (Fig. 4) spaced about the periphery of and meshing with a gear 42 unitary with bushing 20. A one-way drive device 43 (Fig. 3) is interposed between bushing 20 and bushing 37. The pinions 41 are carried on an annulus 44 (Figs. 2 and 5) mounted through the medium of a one-way brake device 45 on an annular journal 46 of casing 3.

Figure 3:
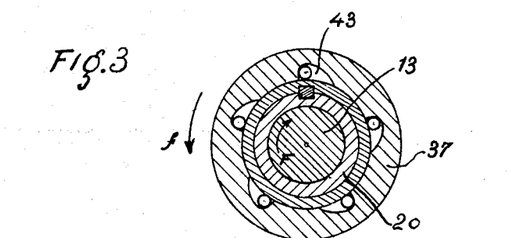
Fig. 3 is a transverse section on line III—III of Fig. 2.
Figure 4:
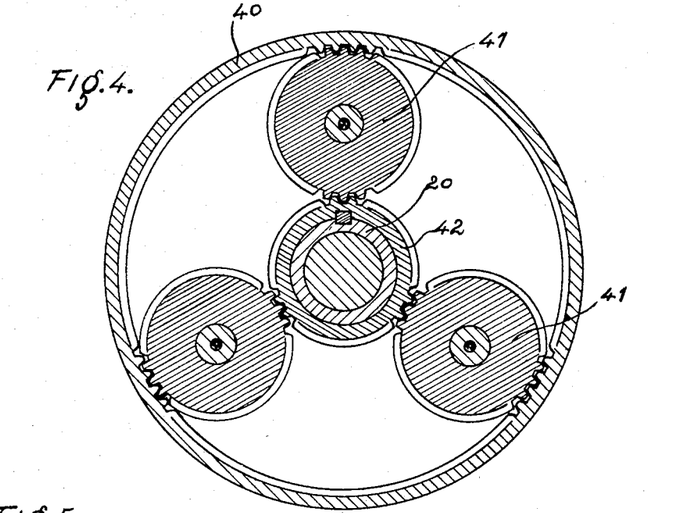
Fig. 4 is a transverse section on line IV—IV of Fig. 2.
Figure 5:
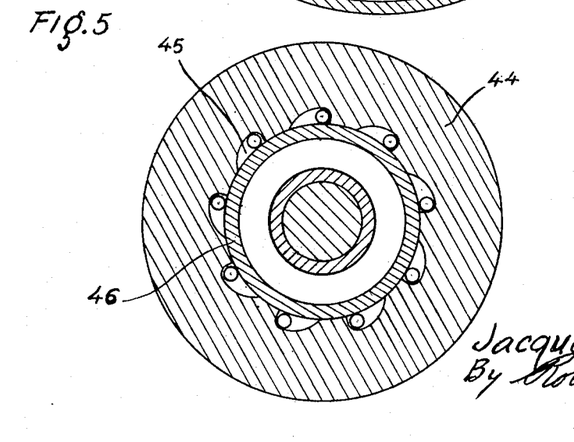
Fig. 5 is a transverse section on line V—V of Fig. 2.

As shown in Figs. 3 to 5, wherein the forward direction of rotation of shaft 13 is indicated by the arrow f and the reverse direction is indicated by arrow F, the bushing 20 cannot revolve in the direction F. If it attempted to revolve in this direction, it would rotate with it the bushing 37 and gear 40 unitary therewith, as well as gear 42, at a common angular rate, and this would rotate the annulus 44 in an orbital motion in the direction F, with gears 41 remaining stationary. Annulus 44 cannot revolve in the direction F, since it is blocked by the one-way drive device 45 with respect to fixed casing 46.

Bushing 20 consequently cannot revolve in a direction reverse from that of the rotation of shaft 13. Bushing 20 being assumed to be rotated in the same direction f as is shaft 13, the balancing unit 7 can assume a restricted range of speeds in either direction. This is true because, as the balancer 7 revolves in the direction f, its rate is restricted to a value not higher than that of the bushing 20 by the one-way drive device 43. When the balancer revolves in the direction F, its speed is restricted by the blocking action of annulus 44 against support 46, to a value which is only a fraction of the speed of bushing 20. In either case, as the balancer unit 7 assumes a motion such that its speed has reached either one of its limits and is retained thereat by the above-described arrangement, the power output developed by the balancer tends to increase the speed of the bushing 20.

Figures 10, 11, 12, 13, 14:
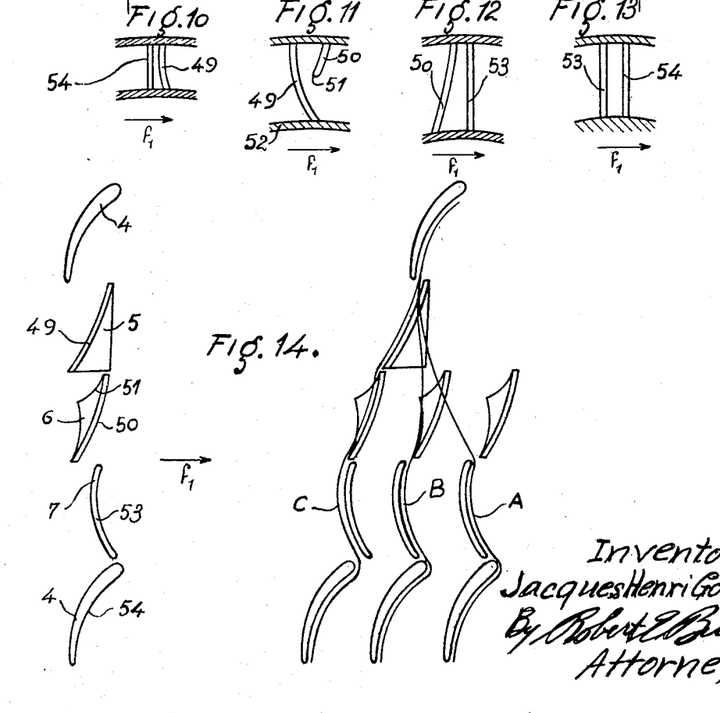
Figs. 10, 11, 12, and 13 are end views of the various types of vanes used in the hydraulic section of the apparatus, in cross section on lines X, XI, XII and XIII of Fig. 9.
Fig. 14 comprises two views illustrating the shape and distribution of said vanes.

The blade structures of the respective components of the hydraulic section of the apparatus (Figs. 9 to 13), are arranged as follows. The first turbine 5 presents a widened flow section between the fluid input 47 and the output 48. The blades 49 of turbine 5 are shaped as shown in end view in Figs. 10 and 11, and in cross section in Fig. 14. The second turbine 6 likewise presents a widened flow section between the inlet and the outlet of the fluid. The vanes 50 of the turbine 6 have a peculiar feature in that they are formed with a notch or cutout 51 on the fluid inlet area. The cutouts 51 are formed along the inner wall 52 of the turbine 6. The vanes 50 are shaped as shown in Figs. 11 and 12 in end view and in Fig. 14 in cross section. The blades 53 and 54 respectively of the balancer unit 7 and the pump 4 are shaped as shown in Figs. 10, 12 and 13 in end view and in Fig. 14 in cross section.

Blades such as 55 (Fig. 9) are moreover secured to the pump 4 in registry with holes 56 formed in the outer wall of the pump. This arrangement makes possible the admission of additional oil from the casing into the pump, so as to assure a satisfactory distribution of oil in the pump regardless of the latter's rate of rotation.

Figure 1:
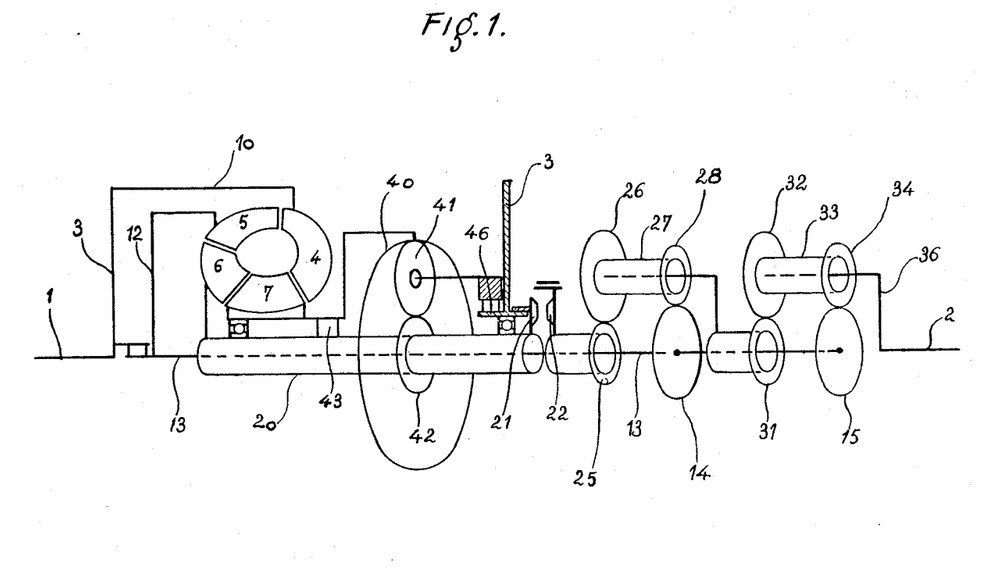
Fig. 1 is a diagrammatical view of a drive transmission device according to the invention.

The above described apparatus operates as follows:

Referring to Figs. 1 and 2, it can be seen that the epicyclic gearings are so arranged and constructed that the driven shaft 2 is rotated at a speed which is equal to the speed of shaft 13 minus the product of the difference between the speeds of shaft 13 and gear 25 times a positive quantity which is less than unity. This results in the following consequences:

(1) If gear 25 is held stationary, the speed of shaft 2 is reduced relative to the speed of shaft 13;

(2) If gear 25 is driven in the same direction as and at a speed lower than shaft 13, the speed of shaft 2 is reduced relative to that of shaft 13, though by a factor less than that obtained with gear 25 held stationary;

(3) If gear 25 is driven in the same direction as and at the same speed as shaft 13, shaft 2 will be rotated at this same speed.

With the clutch face 21 moved into engagement with clutch face 22, the apparatus is started up in the following manner. Shaft 2 being stationary and having applied to it a high opposing torque, shaft 1 is set into motion (in the direction f), thereby driving the pump 4. The oil within the hydraulic torus exerts a transverse thrust in the direction of arrow $f_1$ in Figs. 10 and 14. The oil flowing out of the pump actuates the first turbine 5 secured to shaft 13. This shaft is driven in the direction f at a speed which, owing to the high resistance opposed by shaft 2, tends to rotate bushing 20 in the opposite direction F. However bushing 20 is prevented from rotation in this direction, as previously explained, and is blocked in a fixed position, as is also the balancer unit 7. The shaft 2 revolves at a speed lower than shaft 13, and this speed reduction can be made as large as desired by varying the respective diameters of the epicyclic gears.

Turbine 5 therefore only has to oppose a small fraction of the opposing starting torque, and is easily set into motion, without any, or hardly any, torque conversion occurring between the pump and the turbine. During this clutching-in of the first turbine, the drive fluid flowing out of the first turbine does not any longer have sufficient energy stored in it to drive the subsequent elements of the hydraulic torus.

A time sets in where the opposing torque to be overcome becomes lower than the torque required merely for driving the turbine 5 at the same speed as drive shaft 1. The inertia of the second turbine 6 in stationary condition is gradually overcome, as also is the tendency of the bushing to revolve in the opposite direction. The drive fluid then drives the turbine 6, at first at low speed, thereby bringing the velocity of the driven shaft 2 closer to that of the pump 4 or of the first turbine 5. The actuation of the turbine 6 by the drive fluid is facilitated by the provision of the notches 51 in the vanes of this turbine. As the turbine 6 is first set into motion, the drive fluid has a low velocity so that its flow takes place adjacent of the inner wall 52, and is facilitated by the presence of the notches or cutouts 51 (as shown by the flow lines A in Fig. 14). As the resistance opposed by turbine 6 decreases however, the flow velocity increases. Centrifugal force then causes the liquid to flow adjacent to the outer wall of the torus, outside the notches, and consequently the speed of turbine 6 is caused to increase rapidly. The balancer 7 is, owing to the respective configuration of the vanes 50 and 53 (Fig. 14), driven by the fluid in a direction opposite from that in which the turbine 6 is driven, as shown by the relationship of flow line A with respect to the thrust $f_1$. The speed of balancer unit 7 is, as previously described, limited to a value which is a function of the speed of bushing 20, the rotation of the balancer tending to increase the speed of bushing 20. The hydraulic torus, during this stage of velocity build-up, plays the part of a torque-converter wherein the pump 4 and turbine 5, unitary therewith, would constitute the pump, the turbine 6 would constitute the turbine, and the balancer 7 would constitute the stator reactor, since the motion in reverse direction is blocked or limited to a velocity value which is only a small fraction of the velocity of turbine 6. The flow line of the drive fluid through the torus is indicated at B in Fig. 14. During this stage in which the speed of turbine 6 is built up, the torque exerted thereon is greatly multiplied owing to the speed reduction which takes place.

As the speed of turbine 6 has increased to a predetermined value, the balancer unit 7, after a period of transient instability, is caused to revolve in the same direction as turbine 6 by the action of the vanes, as indicated by the relationship of the flow line C with respect to the direction of the thrust $f_1$ (Fig. 14). The speed of balancer 7 is limited to that of the turbine 6, as already explained, and the balancer tends to increase the speed of the bushing 20 unitary with turbine 6. The component elements of the torus are quickly caused to assume a common speed of bodily rotation, resulting in a direct drive condition, which is the normal steady-state operating condition of the apparatus.

Should during operation the opposing torque increase (on one side or the other), slippage will occur between the various components of the hydraulic torus, in a direction reverse from that which takes place at starting, and the speed of shaft 2 is reduced in proportion as the opposing torque increases.

For each value of the opposing torque, the various elements of the apparatus will automatically assume movement such that the speed of the driven shaft is reduced to the appropriate degree. The motions thus assumed are stable when the opposing torque is stationary or steady and are gradually accelerated or slowed down according to the variations of the opposing torque.

Figures 6, 8:
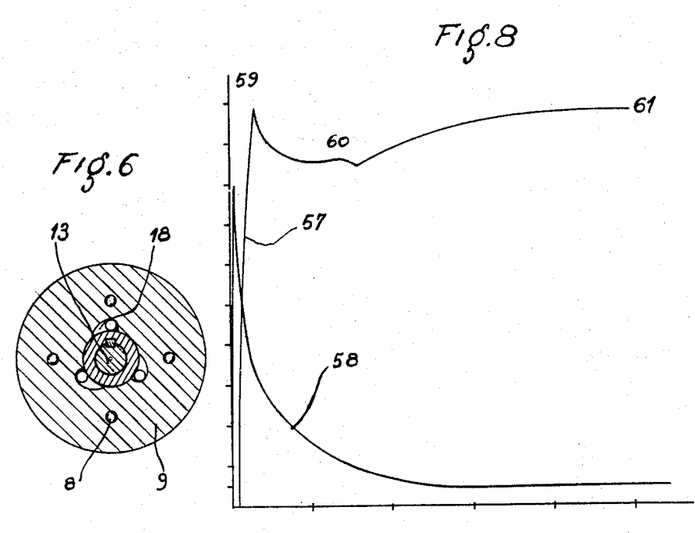
Fig. 6 is a transverse section on line VI—VI of Fig. 2.
Fig. 8 is a diagram illustrating the variations of the efficiency factor of the drive device plotted versus speed.
Figure 7:
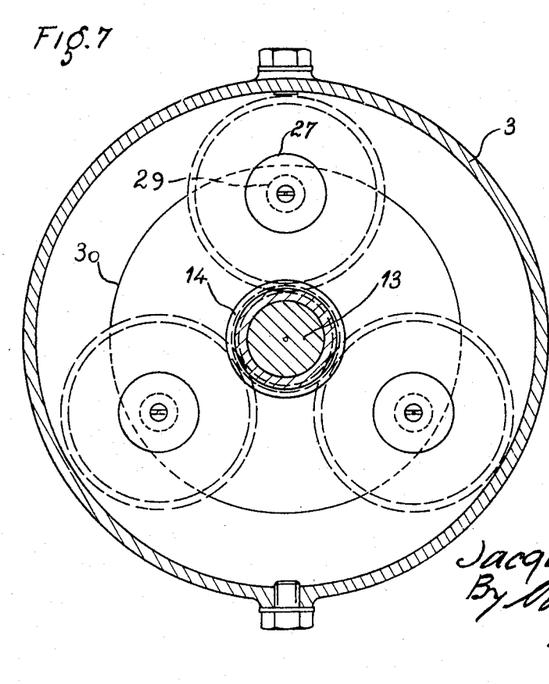
Fig. 7 is a transverse section on line VII—VII of Fig. 2.
Figure 9:
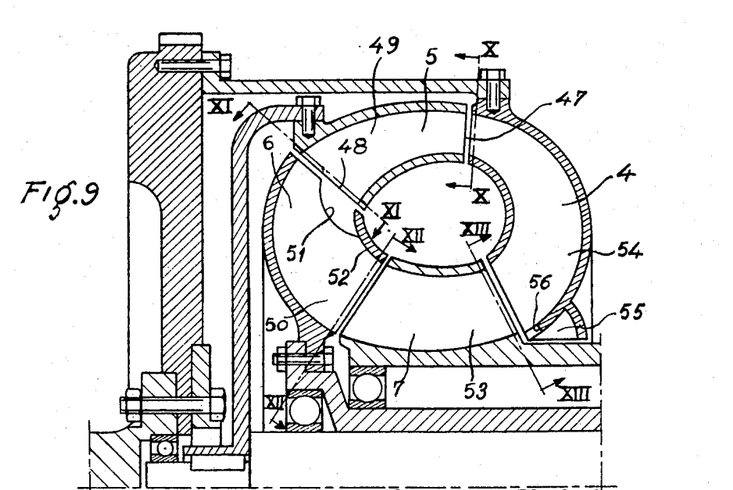
Fig. 9 is a view on an enlarged scale, in longitudinal section, of the hydraulic section of the apparatus.

Fig. 8 illustrates the curve 57 of variations of the efficiency factor of the apparatus, the velocity being plotted as abscissae and the efficiency factor as ordinates. Curve 58 of the same figure illustrates the variations of the torque multiplying factor, in ordinates, versus velocity in abscissae.

The efficiency of the apparatus, as demonstrated by curve 57, is very high already a very short time after starting, this being due in particular to the large speed reduction obtained at starting owing to the provisions of the invention. The high point 59 corresponds to the instant at which, during starting, the first turbine 5 attains the speed of the pump 4.

The slight droop 60 in the curve corresponds to the velocity build-up in the subsequent elements of the hydraulic torus, which proceeds until the direct drive or steady state is attained as at 61.

Figure 15:
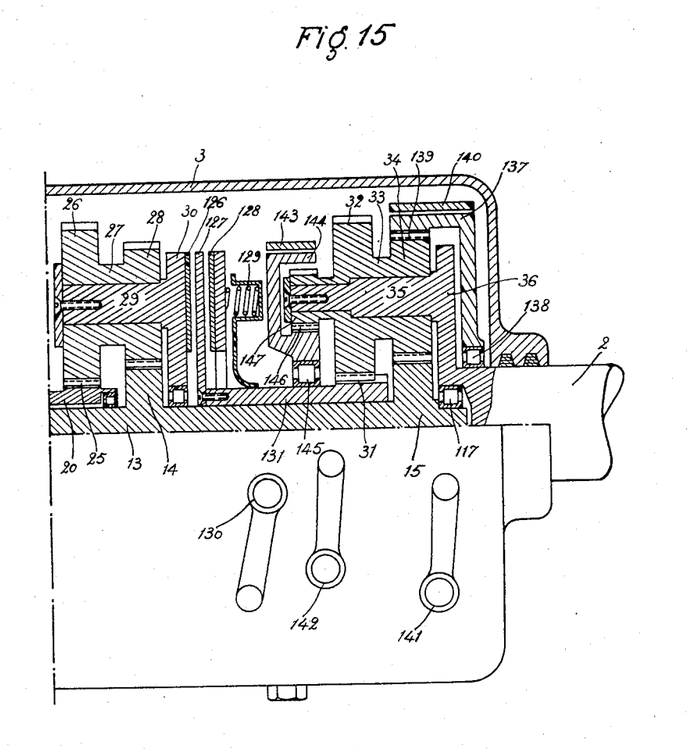
Fig. 15 is a view half in elevation and half in longitudinal section, of a modified portion of the apparatus.

In a modification of the invention (Fig. 15), the arrangement is substantially similar to that shown in Figure 2, and reference numbers of Figure 2 are used in Figure 15 for similar elements.

In figure 15, however, clutch devices and means for rearward movement and idling movement are provided whereby the apparatus is more particularly adapted for use with motor vehicles.

In more detail, the first differential pinion carrier 30 is mounted for free rotation on shaft 13 and comprises a disc 126 cooperating with a clutch device of the disc type. This coupling, which may be of any suitable form, may for example comprise a further disc 127 subjected to the clamping action against the disc 126 by a third disc 128 actuated through a spring transmission 129 from a lever, pedal, or other suitable operating member 130. The disc 127 is unitary with a sleeve 131 mounted for free rotation about shaft 13 and integral with gear 31.

An annulus 137, mounted on ball bearings 138 on shaft 2, is provided with internal teeth 139 in mesh with gear 34. Outwardly of the annulus 137 is a brake lining 140 adapted to block annulus 137 and actuated from a lever 141 or equivalent operating member. A lever 142 is similarly provided for operating a brake lining 143 adapted to block an annulus 144; this annulus is mounted on ball bearings 145 supported on the sleeve 131 and is provided with gear teeth meshing with an additiontal gear 147 unitary with planetary element 33. When the lever 141 is actuated for applying the brake 140 to the annulus 137, the clutch discs 126 and 127 being disengaged, there is introduced into the epicyclic mechanism a compulsory relation between the velocities of shafts 2 and 13, said relation corresponding to the condition in which the gear 34 rolls around the internal teeth 139 of the disc 137.

This arrangement can be used for providing a fixed reducing ratio to the hydraulic part. Thus, in applications to vehicles, the engine can act as a braking element in declivities.

In a similar way, the clutch discs 126 and 127 being disengaged, braking of the annulus 144 imposes a compulsory relationship between the velocities of shafts 2 and 13, but in this case the direction of rotation of shafts 2 and 13 is reversed. Reverse drive is thus provided for under the best possible conditions on operation of the lever 142.

The apparatus according to the invention provides a high-efficiency power transmission at all speeds, without any power losses, especially at starting. It is highly flexible so as to reduce to a material extent wear in the motor elements as well as vibrations. It roes not require the provision of a radiator, of oil pressure pumps, of a regulator or of hydraulic controls, so that it is comparatively inexpensive to construct.

While preferred embodiments of the invention have been described hereinabove and illustrated in the accompanying drawings, it is to be expressly understood that the invention is in no way limited thereto and that many modifications may be made within the scope of the invention. Moreover improved power transmission arrangements according to the invention are applicable to many different types of motors, including engines for road and railway traction, marine and river craft, and aircraft, as well as fixed power plants, as for compressors, etc.

What I claim is:

1. A hydro-mechanical transmission apparatus, comprising a drive shaft, a driven shaft, a rotatable fluid impeller fixed to said drive shaft, a series of fluid impelled units disposed coaxially with said impeller for rotation thereby and including at least a first turbine wheel adjacent to the output of said impeller and a second turbine wheel adjacent to the output of said first turbine wheel, an epicyclic gear train having a sun gear rotatable with said first turbine wheel, a sun gear rotatable with said second turbine wheel, a pinion carrier, and pinions carried by said pinion carrier and engaging said sun gears, and a second epicyclic train having a sun gear rotatable with said pinion carrier, a sun gear connected to said first turbine wheel for rotation therewith, a pinion carrier connected to said driven shaft, and pinions carried by the last mentioned pinion carrier and engaging the last mentioned sun gears.

2. A hydro-mechanical transmission apparatus, comprising a drive shaft, a driven shaft rotatable coaxially with said drive shaft, a rotatable fluid impeller fixed to said drive shaft, a series of fluid impelled units disposed coaxially with said impeller for rotation thereby and including at least a first turbine wheel adjacent to the output of said impeller and a second turbine wheel adjacent to the output of said first turbine wheel, an epicyclic gear train having a sun gear rotatable with said first turbine wheel, a sun gear rotatable with said second turbine wheel, a pinion carrier, and pinions carried by said pinion carrier and engaging said sun gears, and a second epicyclic gear train having a sun gear rotatable with said pinion carrier for rotation therewith, a sun gear connected to said first turbine wheel for rotation therewith, a pinion carrier connected to said driven shaft, and pinions carried by the last mentioned pinion carrier and engaging the last mentioned sun gears.

3. A hydro-mechanical transmission apparatus, comprising a drive shaft, a driven shaft rotatable coaxially with said drive shaft, a rotatable fluid impeller fixed to said drive shaft, a series of fluid impelled units disposed coaxially with said impeller for rotation thereby and including a first turbine wheel adjacent to the output of said impeller, a second turbine wheel adjacent to the output of said first turbine wheel, and a reactor wheel adjacent to the output of said second turbine wheel, an epicyclic gear train having a sun gear connected to said first turbine wheel for rotation therewith, a sun gear connectible to said second turbine wheel for rotation therewith, a pinion carrier, and pinions carried by said pinion carrier and engaging said sun gears, and a second epicyclic gear train having a sun gear rotatable with said pinion carrier, a sun gear connected to said first turbine wheel for rotation therewith, a pinion carrier connected to said driven shaft and pinions carried by the last mentioned pinion carrier and engaging the last mentioned sun gears.

4. A hydro-mechanical transmission apparatus comprising a drive shaft, a driven shaft rotatable coaxially with said drive shaft, a rotatable fluid impeller fixed to said drive shaft, a series of fluid impelled units disposed coaxially with said impeller for rotation thereby and including a first turbine wheel adjacent to the output of said impeller, a second turbine wheel adjacent to the output of said first turbine wheel, and a reactor wheel adjacent to the output of said second turbine wheel, an epicyclic gear train having a sun gear connected to said first turbine wheel for rotation therewith, a sun gear rotatable with said second turbine wheel, a pinion carrier, and pinions carried by said pinion carrier and engaging said sun gears, a second epicyclic gear train having a sun gear rotatable with said pinion carrier, a sun gear connected to said first turbine wheel for rotation therewith, a pinion carrier connected to said driven shaft and pinions carried by the last mentioned pinion carrier and engaging the last mentioned sun gears, a third epicyclic gearing including a sun gear connected with said second turbine wheel for rotation therewith, an annulus gear connected with said reactor wheel for rotation therewith, a pinion carrier and pinions carried by the last mentioned pinion carrier and engaging the last mentioned sun gear and annulus gear, a fixed drum, a one way brake connection between the last mentioned pinion carrier and said drum, and a second one-way drive connection between the second turbine and reactor wheels, the directions for free rotation of both one-way connections being such that the first mentioned one-way brake connection opposes rearward movement of the last mentioned pinion carrier with respect to said drum, while the last mentioned one-way drive connection opposes forward movement of the reactor wheel with respect to the second turbine wheel, whereby the rearward rotation of said second turbine wheel is prevented and, on forward rotation of said second turbine wheel, the second turbine and reactor wheels speeds ratio is limited between two fixed numbers having contrary signs and different absolute values.

5. A hydro-mechanical transmission apparatus, comprising a drive shaft, a driven shaft, a rotatable fluid impeller fixed to said drive shaft, a series of fluid impelled units disposed coaxially with said impeller for rotation thereby and including at least a first turbine wheel adjacent to the output of said impeller and a second turbine wheel adjacent to the output of said first turbine wheel, an epicyclic gear train having a sun gear connected to said first turbine wheel for rotation therewith, a sun gear connected to said second turbine wheel for rotation therewith, a pinion carrier, and pinions carried by said pinion carrier and engaging said sun gears, a clutch device, and a second epicyclic gear train having a sun gear connected through said clutch device to said pinion carrier, a sun gear connected to said first turbine wheel for rotation therewith, a pinion carrier connected to said driven shaft and pinions carried by the last mentioned pinion carrier and engaging the last mentioned sun gears.

6. A hydro-mechanical transmission apparatus, comprising a drive shaft, a driven shaft, a rotatable fluid impeller fixed to said drive shaft, a series of fluid impelled units disposed coaxially with said impeller for rotation thereby and including a first turbine wheel adjacent to the output of said impeller, a second turbine wheel adjacent to the output of said first turbine wheel, and a reactor wheel adjacent to the output of said second turbine wheel, an epicyclic gear train having a sun gear connected to said first turbine wheel for rotation therewith, a sun gear connected to said second turbine wheel for rotation therewith, a pinion carrier, and pinions carried by said pinion carrier and engaging said sun gears, a clutch device, and a second epicyclic gear train having a sun gear connected through said clutch device to said pinion carrier, a sun gear connected to said first turbine wheel for rotation therewith, a pinion carrier connected to said driven shaft and pinions carried by the last mentioned pinion carrier and engaging the last mentioned sun gears.

7. A hydro-mechanical transmission apparatus, comprising a drive shaft, a driven shaft rotatable coaxially with said drive shaft, a rotatable fluid impeller fixed to said drive shaft, a series of fluid impelled units disposed coaxially with said impeller for rotation thereby and including at least a first turbine wheel adjacent to the output of said impeller and a second turbine wheel adjacent to the output of said first turbine wheel, an epicyclic gear train having a sun gear connected to said first turbine wheel for rotation therewith, a sun gear connected to said second turbine wheel for rotation therewith, a pinion carrier, and pinions carried by said pinion carrier and engaging said sun gears, a second epicyclic gear train having a sun gear connected to said pinion carrier for rotation therewith, a sun gear connected to said first turbine wheel for rotation, a pinion carrier connected to said driven shaft and pinions carried by the last mentioned pinion carrier and engaging the last mentioned sun gears, a freely rotatable annulus mounted coaxially with the apparatus and meshing with one of said pinions of the second mentioned epicyclic gear train, and a brake associated with said annulus, so that when said brake is actuated, the movement transmitted is converted but maintained forwardly.

8. Hydro-mechanical transmission apparatus, comprising a drive shaft, a driven shaft rotatable coaxially with said drive shaft, a rotatable fluid impeller fixed to said drive shaft, a series of fluid impelled units disposed coaxially with said impeller for rotation thereby and including a first turbine wheel adjacent to the output of said impeller, a second turbine wheel adjacent to the output of said first turbine wheel, and a reactor wheel adjacent to the output of said second turbine wheel, an epicyclic gear train having a sun gear rotatable with said first turbine wheel, a sun gear rotatable with second turbine wheel, a pinion carrier, and pinions carried by said pinion carrier and engaging said sun gears, a second epicyclic gear train having a sun gear rotatable with said pinion carrier, a sun gear connected to said first turbine wheel for rotation therewith, a pinion carrier connected to said driven shaft and pinions carried by the last mentioned pinion carrier and engaging the last mentioned sun gears, a freely rotatable annulus mounted coaxially with the apparatus and meshing with one of said pinions of the second mentioned epicyclic gear train and a brake associated with said annulus, so that when said brake is actuated, the movement transmitted is converted but maintained forwardly.

9. A hydro-mechanical transmission apparatus comprising a drive shaft, a driven shaft rotatable coaxially with said drive shaft, a rotatable fluid impeller fixed to said drive shaft, a series of fluid impelled units disposed coaxially with said impeller for rotation thereby and including at least a first turbine wheel adjacent to the output of said impeller and a second turbine wheel adjacent to the output of said first turbine wheel, an epicyclic gear train having a sun gear rotatable with said first turbine wheel for rotation therewith, a sun gear rotatable with said second turbine wheel, a pinion carrier, and pinions carried by said pinion carrier and engaging said sun gears, a second epicyclic gear train having a sun gear rotatable with said pinion carrier for rotation therewith, a sun gear connected to said first turbine wheel, for rotation therewith, a pinion carrier connected to said driven shaft and pinions carried by the last mentioned pinion carrier and engaging the last mentioned sun gears, a freely rotatable annulus mounted coaxially with the apparatus, a gear carried by said annulus, a gear unitary with at least one of said pinions of said second mentioned epicyclic gear train and meshing with said gear carried by said annulus, and a brake associated with said annulus, so that when said brake is actuated, the movement transmitted is converted and reversed.

10. A hydro-mechanical transmission apparatus, comprising, a drive shaft, a driven shaft rotatable coaxially with said drive shaft, a rotatable fluid impeller fixed to said drive shaft, a series of fluid impelled units disposed coaxially with said impeller for rotation thereby and including a first turbine wheel adjacent to the output of said impeller, a second turbine wheel adjacent to the output of said first turbine wheel, and a reactor wheel adjacent to the output of said second turbine wheel, an epicyclic gear train having a sun gear rotatable with said first turbine wheel, a sun gear rotatable with said second turbine wheel, a pinion carrier, and pinions carried by said pinion carrier and engaging said sun gears, a second epicyclic gear train having a sun gear connected to said pinion carrier for rotation therewith, a sun gear connected to said first turbine wheel for rotation therewith, a pinion carrier connected to said driven shaft and pinions carried by the last mentioned pinion carrier and engaging the last mentioned sun gears, a freely rotatable annulus mounted coaxially with the apparatus, a gear carried by said annulus, a gear unitary with at least one of said pinions of said second mentioned epicyclic gear train and meshing with said gear carried by said annulus, and a brake associated with said annulus, so that when said brake is actuated, the movement transmitted is converted and reversed.

References Cited in the file of this patent

UNITED STATES PATENTS

| | | |
|---|---|---|
| 2,312,849 | Pollard | Mar. 2, 1943 |
| 2,317,498 | Tipton | Apr. 27, 1943 |
| 2,326,994 | Duffield | Aug. 17, 1943 |
| 2,498,797 | Duffield | Feb. 28, 1950 |
| 2,578,450 | Pollard | Dec. 11, 1951 |
| 2,624,215 | McRae | Jan. 6, 1953 |